Figure 1:
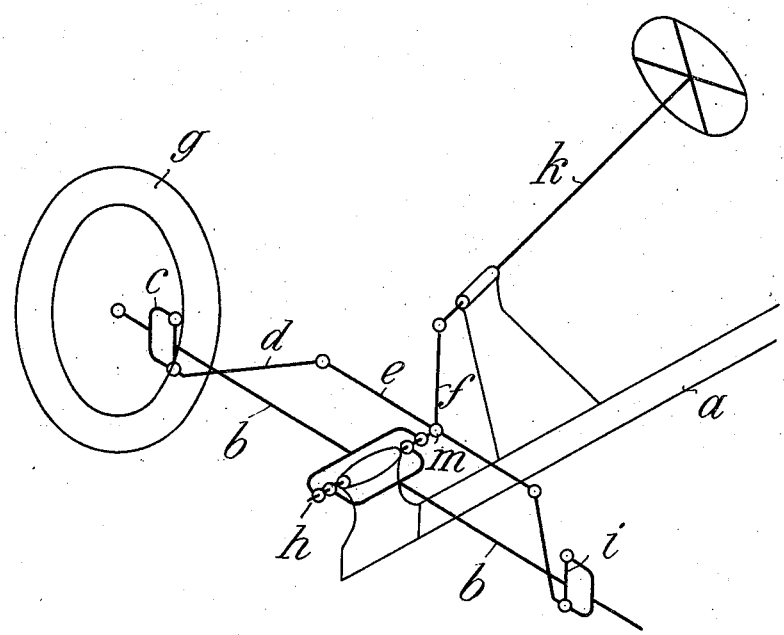

July 17, 1928.

M. WAGNER 1,677,419

STEERING GEAR

Filed April 28, 1923    2 Sheets-Sheet 1

Inventor
MAX WAGNER
by
Lorka, Kehlenbeck & Mathé
Attorneys

July 17, 1928. 1,677,419
M. WAGNER
STEERING GEAR
Filed April 28, 1923 2 Sheets-Sheet 2

Fig. 2.

INVENTOR
MAX WAGNER
BY
ATTORNEYS

Patented July 17, 1928.

1,677,419

UNITED STATES PATENT OFFICE.

MAX WAGNER, OF MANNHEIM, GERMANY, ASSIGNOR TO BENZ & CIE. RHEINISCHE AUTOMOBIL- u. MOTOREN-FABRIK AKTIENGESELLSCHAFT, OF MANNHEIM, GERMANY, A CORPORATION OF GERMANY.

STEERING GEAR.

Application filed April 28, 1923, Serial No. 635,341, and in Germany May 1, 1922.

My invention relates to improvements in steering mechanism for road vehicles, and more particularly for motor vehicles, and one of the objects of the improvements is to provide a vehicle in which the front or steering wheels are mounted on sectional axles having rocking supports on pivot bolts disposed in the direction of the longitudinal axis of the vehicle and acted upon by springs permitting the same to yield in vertical direction. Another object of the improvements is to provide steering mechanism for front wheels of this type which is operative in any of the positions of the front wheels. With these objects in view my invention consists in the matters to be described hereinafter and particularly pointed out in the appended claims.

For the purpose of explaining the invention and example embodying the same has been shown in the accompanying drawing showing the front part of the vehicle in a diagrammatical perspective way.

In the example shown in the drawing my improved vehicle comprises a frame or chassis mounted on a pair of rear or driving wheels (not shown) and a pair of front or steering wheels $g$ only one of which is shown. A part of the vehicle frame has been indicated by the character $a$, and the said part is provided at its front end with a pivot bolt $h$ disposed longitudinally of the vehicle and in the longitudinal median plane thereof. The pivot bolt $h$ provides a fulcrum for two sectional axles $b$ carrying at their free ends the axle ends $c$ for the front wheels $g$. The sectional axles $b$ are acted upon by springs $s$ bearing on suitable parts of the vehicle frame and tending to force the wheels $g$ downwardly. To the axle ends $c$ steering rods $d$ are secured, which are connected by links $e$ with an arm $f$ secured to the steering pole $k$. With the wheels $g$ in normal positions the joint $m$ connecting the links $e$ and the arm $f$ is in alignment with the axis of the pivot bolt $h$. Therefore the changes in the positions of the parts of the steering mechanism relatively to the wheels caused by the upward or downward movement of the wheels $g$ are reduced to a minimum.

The operation of the mechanism is as follows: When the vehicle moves over uneven roads the front wheels $g$ are free to yield upwardly against the action of the springs acting upon the sectional axles $b$. For steering the vehicle the steering pole $k$ is turned about its axis, whereby the arm $f$ is rocked to the right or left, and such rocking movement is transmitted by the links $e$ and the rods $d$ to the axle ends $c$ and the wheels $g$.

While in describing the invention reference has been made to a particular example embodying the same I wish it to be understood that my invention is not limited to the construction shown in the drawing, and that various changes may be made in the general arrangement of the apparatus and the construction of its parts without departing from the invention.

I claim:

1. In a vehicle, the combination with the frame, of a front axle comprising a pair of complemental axle sections, a pivotal connection between said axle sections and said frame, said pivotal connection being common to both of the axle sections and being disposed longitudinally of the vehicle in registry with the median plane thereof, yielding means tending to force said axle sections downwardly, a steerable wheel mounted upon each axle section to swing relatively thereto about a vertical axis, and steering mechanism operatively connected with said steerable wheels.

2. In a vehicle, the combination with the frame, of a front axle comprising a pair of complemental axle sections, mounted upon said frame to rock in vertical directions on a fulcrum disposed longitudinally of the vehicle in registry with the median plane thereof, yielding means tending to force the axle sections downwardly, a steerable wheel mounted upon each axle section to swing relatively thereto about a vertical axis and steering mechanism operatively connected with said steerable wheels and including a joint common to both wheels and located in substantial alignment with said fulcrum in the normal position of said wheels.

3. In a vehicle, the combination with the frame, of a front axle comprising a pair of complemental axle sections, mounted upon said frame to rock in vertical directions on a fulcrum disposed longitudinally of the vehicle in registry with the median plane thereof, yielding means tending to force the axle section downwardly, a steerable wheel mounted upon each axle section to swing relatively thereto about a vertical axis, links connected with said wheels, a steering member and a pivotal connection between said links and steering member for operatively connecting the same, said pivotal connection being in alignment with said fulcrum in the normal position of said wheels.

4. In a vehicle, the combination with the frame, of a front axle comprising a pair of complemental axle sections, mounted upon said frame to rock in vertical direction on a fulcrum disposed longitudinally of the vehicle in registry with the median plane thereof, yielding means tending to force the axle sections downwardly, a steerable wheel mounted upon each axle section to swing relatively thereto about a vertical axis, a steering device, an arm rigidly connected therewith, and links pivotally connected with said steerable wheels and with said arm, the pivotal connection between the latter and said links being in alignment with said fulcrum in the normal position of said wheels.

5. In a vehicle, the combination with the frame, of a front axle comprising a pair of complemental axle sections, mounted upon said frame to rock in vertical directions on a fulcrum disposed longitudinally of the vehicle in registry with the median plane thereof, yielding means tending to force the axle sections downwardly, a steerable wheel mounted upon each axle section to swing relatively thereto about a vertical axis, a steering post located in registry with the longitudinal median line of the vehicle, an arm rigidly carried by said post and depending from an end thereof, and links pivotally connected with said steerable wheels and with said arm, the pivotal connection between the latter and said links being in alignment with said fulcrum in the normal position of the parts.

MAX WAGNER.